April 3, 1934. S. E. FINLEY ET AL 1,953,825
APPARATUS AND METHOD FOR LAYING ROADWAYS
Filed Oct. 13, 1932   5 Sheets-Sheet 1

Inventors
S. E. Finley
R. D. Kneale
By Church & Church
Their Attorneys

April 3, 1934.　　　　S. E. FINLEY ET AL　　　1,953,825
APPARATUS AND METHOD FOR LAYING ROADWAYS
Filed Oct. 13, 1932　　　5 Sheets-Sheet 2
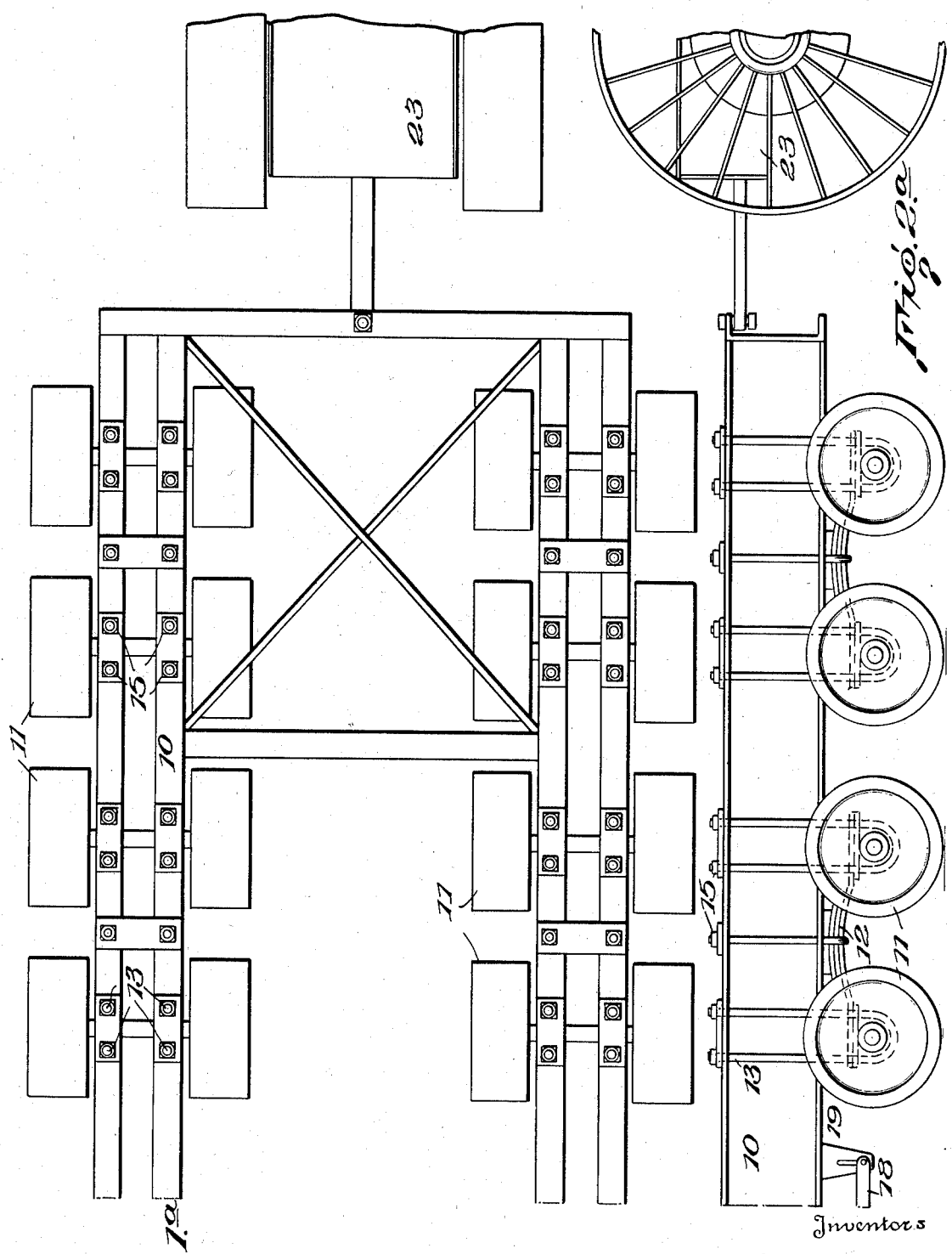
Inventors
S. E. Finley
R. D. Kneale
By Church & Church
Their Attorneys

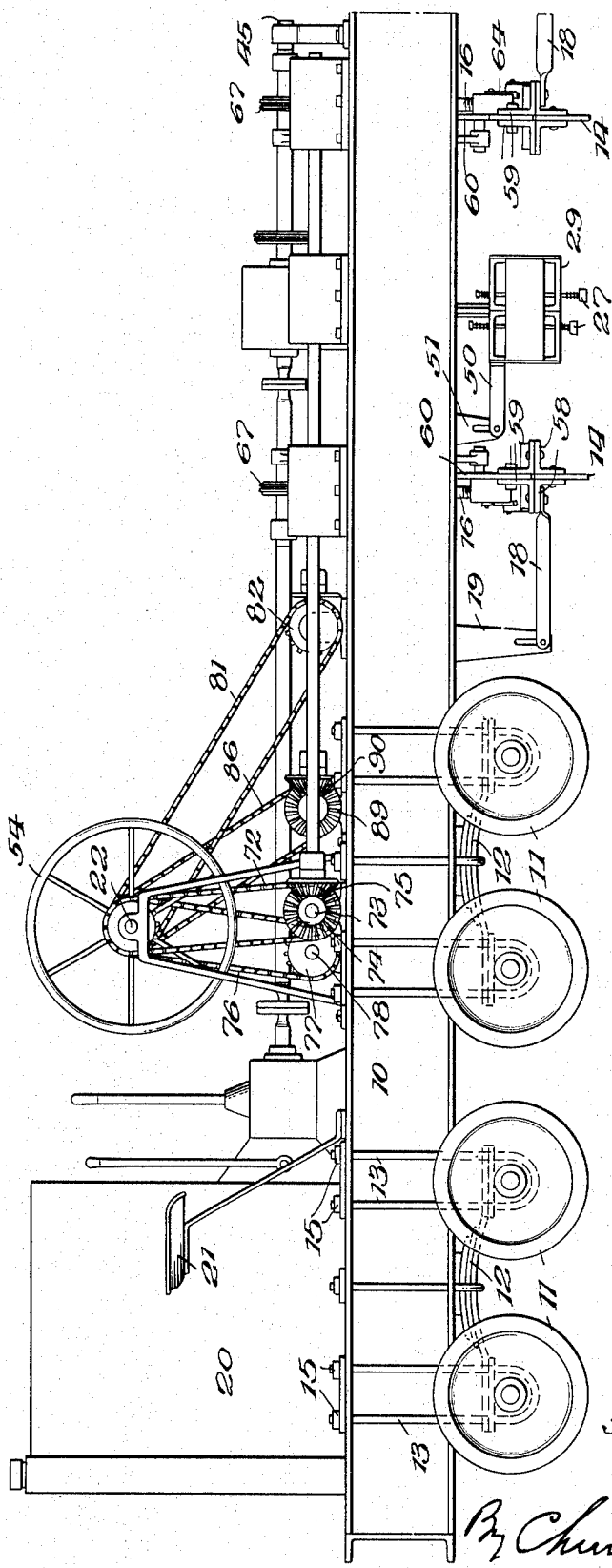

April 3, 1934.　　　S. E. FINLEY ET AL　　　1,953,825
APPARATUS AND METHOD FOR LAYING ROADWAYS
Filed Oct. 13, 1932　　　5 Sheets-Sheet 4
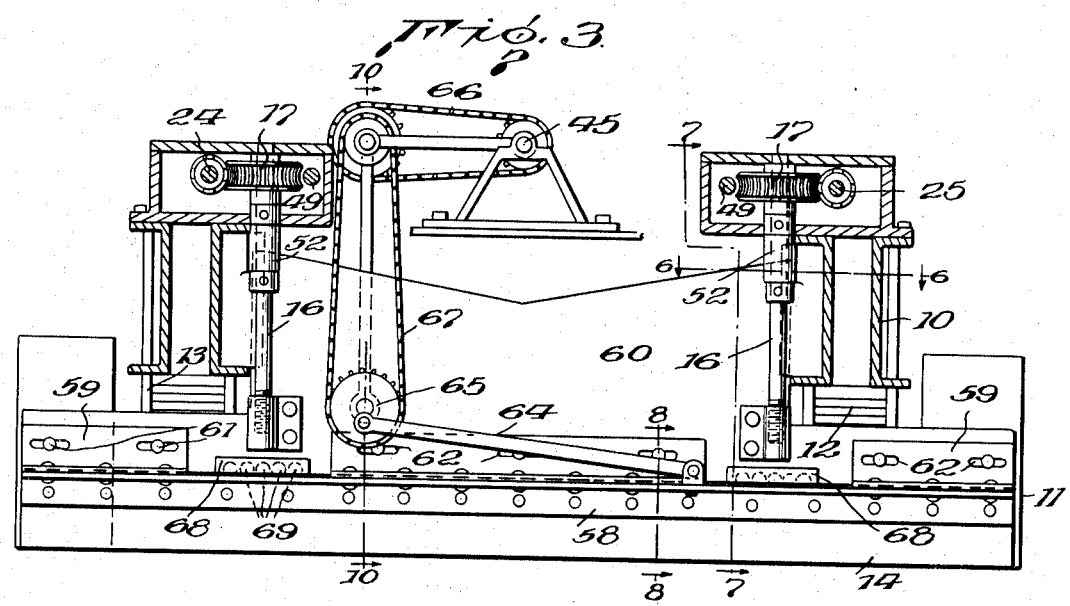
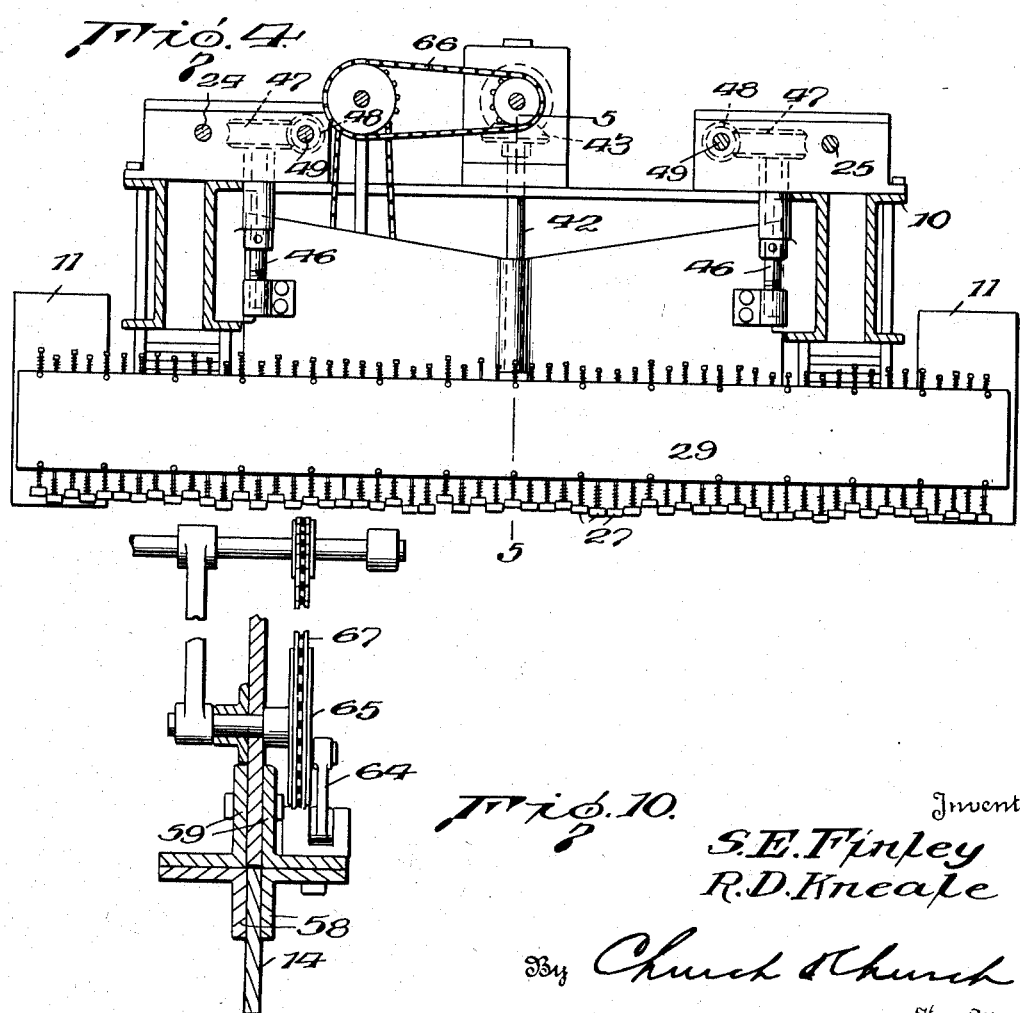
Inventors
S. E. Finley
R. D. Kneale
By Church & Church
Their Attorneys

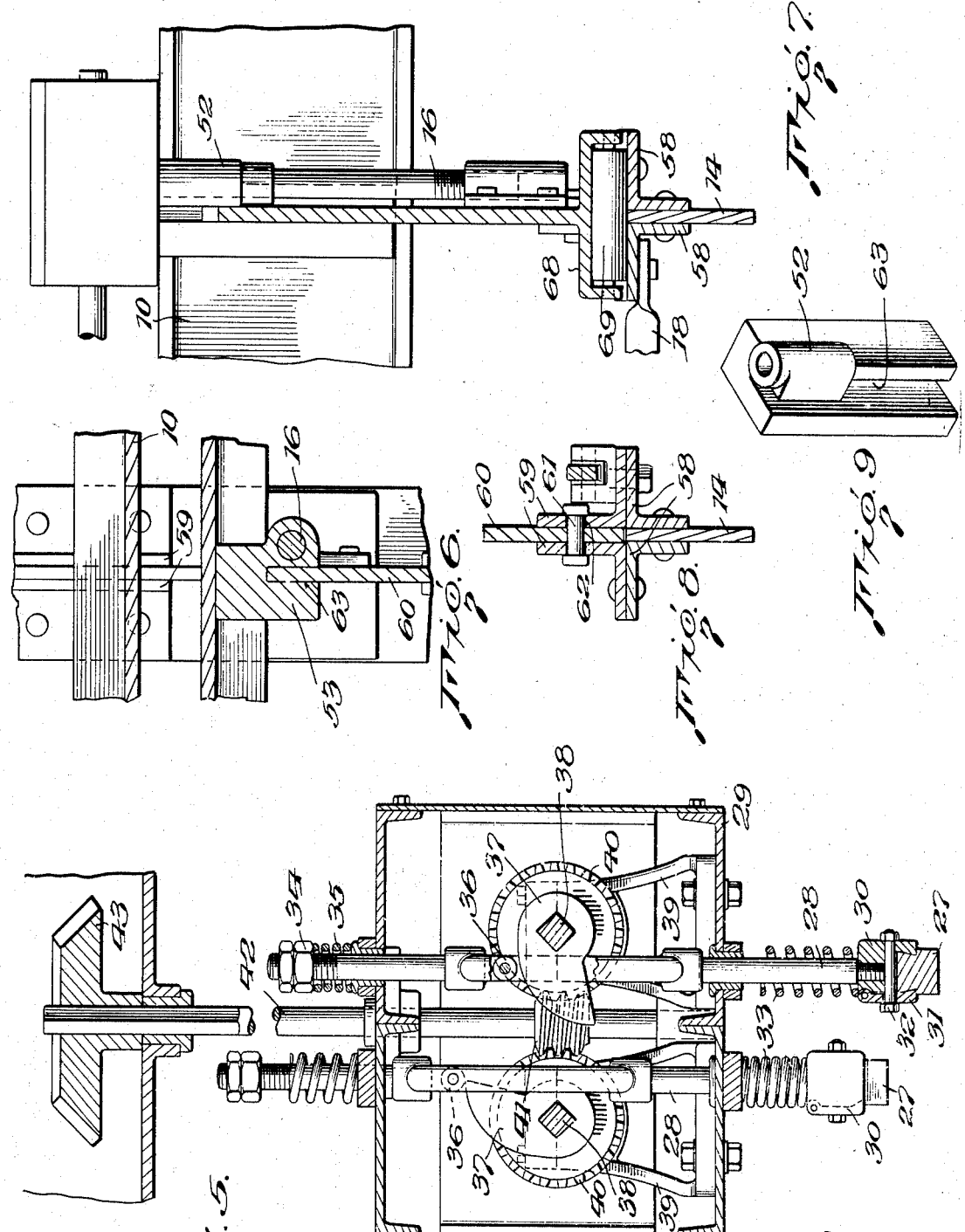

Patented Apr. 3, 1934

1,953,825

UNITED STATES PATENT OFFICE 1,953,825

APPARATUS AND METHOD FOR LAYING ROADWAYS

Sam E. Finley and Robert D. Kneale, Atlanta, Ga.

Application October 13, 1932, Serial No. 637,633

10 Claims. (Cl. 94—49)

This invention relates to a method and apparatus designed for use in building load-carrying structures composed of rock detritus, earthy matter and the like, such as highways or roadways, embankments, levees, railway beds and the like, by means of which method and apparatus such structures are so consolidated and smoothed during the building thereof that loads later placed upon them, whether static or moving, will cause no detrimental movement of particle upon particle within the structure to thus destroy the built-in surface-smoothness and supporting power of any layer of which the whole structure is composed.

Expressed broadly, the method by which these objects are obtained, for instance in the building of roadways, consists in depositing successive layers of the materials of which the roadway is constructed, eliminating all irregularities in the surface of each individual layer as it is deposited, and finally impacting the material of each individual layer, the impactions being delivered to comparatively small zones of the layer surface, the size of these zones or areas being less than the minimum area affected by traffic loads imposed upon the completed or finished surface. In other words, the size of the working face of the impacting instrument is such that it cannot engage an area greater than the minimum area in which traffic loads imposed upon the finished surface are concentrated. Another detail in the method of the present invention, and in the apparatus, in connection with the elimination of irregularities in the surface of each successive layer of material deposited, is the maintenance of the instrument, by which this is accomplished, in a fixed horizontal plane. That is, the apparatus is adapted to be propelled along the roadway or other structure being built and carries a leveling instrument which moves in a fixed plane parallel to the surface desired in the ultimate construction regardless of any irregularities which the ground wheels of the apparatus may encounter. This leveling instrumentality thus eliminates all irregularities in any loosely deposited layer of material placed in the roadway, after which a series of tamps impact each layer until neither high nor low areas remain, and until further increase in density through tamping is impractical.

Preferably, the impacting members or tamps are of the rebounding type, so that an instantaneous blow is delivered to the surface being impacted, whereby there is no drag of the tamps on the surface, notwithstanding the continuous movement or propulsion of the apparatus over the surface being worked upon. Also, these tamps and the leveling instrumentalities of the apparatus are carried on a rigid frame or chassis, the latter being so mounted that its elevation is not altered in passing over irregularities in the surface being worked. All of the instrumentalities employed may be mounted upon a single chassis, although it is possible, of course, that separate ones may be utilized, one for the leveling devices which would precede another vehicle carrying the tamps over the surface being worked.

In using this apparatus, the materials of which the roadway or other structure is to be composed are first deposited in layers, as mentioned, of what will be termed suitable general thickness, and each layer smoothed and tamped. By the term "suitable general thickness", is meant a thickness that can be compacted throughout its entire depth by the method of the present invention. Maximum density is reached when further tamping tends to break up the material and thus weaken its structural strength, and when each layer has been so compacted that loads later placed upon the structure will not cause internal movement of particle upon particle within the structure. However, the degree of compaction is, of course, a function of the size, weight and velocity of the tamp, as well as the time during which a given area or zone is subjected to tamping, all of which factors may be readily regulated and which are easily determined by those skilled in the art.

In the accompanying drawings, wherein there is illustrated the preferred embodiment of the apparatus for carrying into effect the present method.

Figures 1, 1a jointly constitute a top plan view of the preferred form of apparatus;

Figs. 2, 2a constitute a side elevational view with certain parts illustrated more or less diagrammatically;

Fig. 3 is a transverse section on the line 3—3 of Fig. 1;

Fig. 4 is a similar view on the line 4—4 of Fig. 1;

Fig. 5 is a vertical sectional view on the line 5—5 of Fig. 4;

Fig. 6 is a sectional view on line 6—6 of Fig. 3;

Fig. 7 is a sectional view on line 7—7 of Fig. 3;

Fig. 8 is a sectional view on line 8—8 of Fig. 3;

Fig. 9 is a detail view;

Fig. 10 is a sectional view on line 10—10 of Fig. 3.

Figure 1:
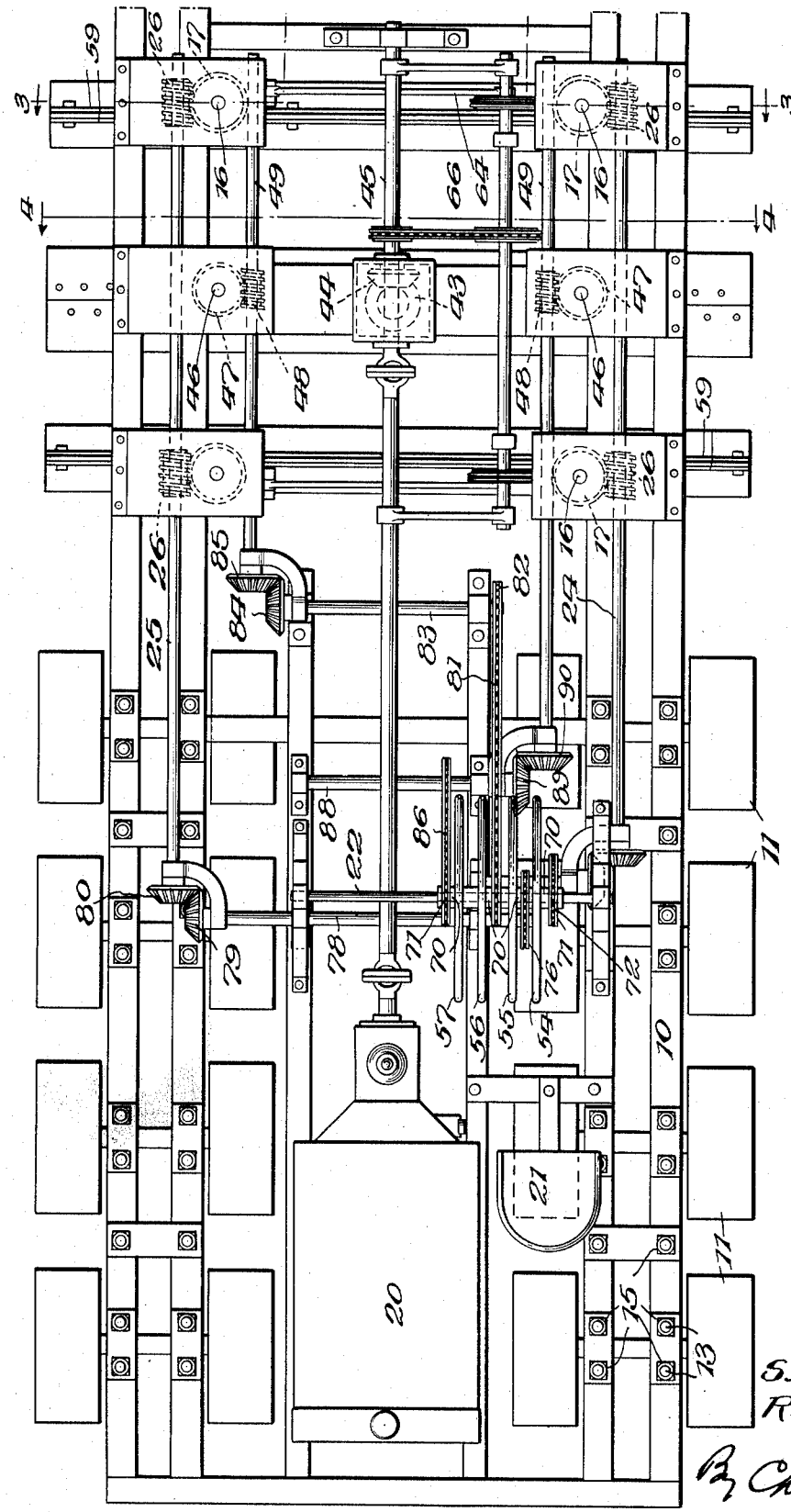

As before mentioned, both the leveling and tamping instrumentalities may be carried on a single chassis 10, of rigid construction and of sufficient length to bridge all irregularities in the surface being worked. This chassis is mounted upon the ground wheels 11, journaled in bearings attached to springs 12 suspended below the chassis 10. The bearings for these ground wheels are slidable vertically in ways formed by U-shaped members 13 attached to the chassis. Members 13 function as snubbers whereby, when a ground wheel passes over a depression in the surface being worked, its movement downwardly, with respect to the chassis, is limited by the snubber 13, but, on the other hand, in the event a ground wheel engages an elevation on the surface, that wheel may rise in the way formed by the snubber 13, against the pressure of its spring 12, this upward movement of the wheel being independent of any movement of the chassis. In this way, the chassis is not only a rigid construction, but its location vertically with respect to the surface being worked is not affected by any irregularities in that surface. This constant position of the chassis is important because the leveling instrumentalities, in the form of blades or lutes 14 mounted thereon, are, in this fashion, moved along the surface being worked in a plane fixed with respect to said surface. The position of the ground wheels 11 may be altered at will by having the snubbers 13 vertically adjustable in the chassis, the snubbers being retained in any desired position by nuts 15 on their upper ends which are threaded for the reception of said nuts. Likewise, the blades or lutes 14 may be adjusted vertically with respect to the chassis. This is preferably accomplished by having the lutes threaded on the lower extremities of rods 16 journaled in bearings 52. At their upper ends rods 16 are provided with wheels 17 capable of being turned, in groups, for adjusting the lutes. The lutes may also have attached thereto links 18 loosely connected to brackets 19 projecting downwardly from the chassis for preventing lateral movement of the lutes.

As shown more or less diagrammatically in Figs. 1 and 2, there is mounted upon the chassis a suitable power unit 20 for actuating the tamps. A tractor 23 may be provided for the purpose of propelling the apparatus. A seat for the operator is provided at 21, and adjacent said seat there is journaled in suitable supports above the chassis, a shaft 22 on which a plurality of hand wheels 54, 55, 56 and 57 are journaled. Through suitable connections, shown more or less diagrammatically and hereinafter more fully described, motion may be transmitted from said shaft by the operator to longitudinally extending shafts 24, 25, at opposite sides of the machine and these shafts carry worms 26 engaging with the worm wheels 17 at the upper ends of rods 16 on which the lutes are mounted, whereby the lutes may be readily raised or lowered with respect to the chassis.

In the present illustration, only one group of tamping devices is shown, with a lute or leveling device arranged fore and aft thereof. It will be understood, however, that these devices may be duplicated, as desired. These tamping devices are shown in detail in Fig. 5. Extending across the chassis between the lutes 14, are a plurality of rows of tamping devices, the tamping heads 27 of which are carried on stems or rods 28 slidable vertically in cross members 29 below the chassis. In order to interchangeably use tamp heads of various sizes or weights, as well as to permit their replacement when worn, said heads are removably attached to the rods or stems 28. For instance, there is threaded on the lower end of each stem a block 30 having a recess in its lower face for reception of the tamp head, one wall of this recess being formed by a plate 31 hinged to the side of the block, but which may be clamped against the block and tamp head by a cross bolt 32 to retain the head in said recess. Interposed between the block 30 of each tamp, and the lower cross members 29, and surrounding each tamp stem, is a spring 33 and interposed between adjustable nuts 34 at the upper end of each stem and the upper cross members 29 are springs 35. Intermediate the upper and lower cross members 29, each tamp stem carries a cam roller 36, adapted to be engaged by a cam 37. Cams 37 are mounted on cam shafts 38 journaled transversely of the chassis. The shaft 38 for each row of tamps is journaled in suitable bearings carried by brackets 39 mounted on the lower cross members 29 and, as indicated in Fig. 5, the disposition of the various cams circumferentially of their respective shafts is preferably such that the impactions of the tamps of the entire group will be delivered successively instead of all being delivered in the same moment, thereby reducing to a minimum shocks or vibrations that might otherwise be set up in the chassis. Rotary motion is transmitted to the shafts 38 by having the latter provided with worm wheels 40 engaging a worm 41 mounted on a vertically extended shaft 42 which carries at its upper end a bevel gear 43 engaging with a bevel gear 44 on a drive shaft 45 driven by the power unit 20. The upper end of shaft 42 is of angular cross-section and is slidable axially of gears 44 to allow vertical adjustment of cross members 29 as later described.

The springs 33, 35, are provided at the lower and upper ends of each tamp stem in order that the blow imparted by the tamp head against the surface being tamped will be instantaneous, whereby movement of the vehicle or apparatus over the surface will not cause the tamp head to drag, so to speak, along that surface. That is, when a cam 37 elevates a tamp as illustrated in the left-hand row of tamps in Fig. 5, the lower spring 33 on that tamp will be compressed and when the cam 37 moves out of engagement with its cam roller 36, said spring 33 will project the tamp head 27 against the surface being worked. This downward movement of the tamp, however, will compress the upper spring 35, as shown in connection with the tamp in the right-hand row of tamps in Fig. 5 and the compression of the spring 35 will cause the tamp to rebound substantially instantaneously. In other words, the tamp in the left-hand row of tamps in Fig. 5 is shown in its extreme elevated position and the tamp in the right-hand row is shown in the position it occupies at the instant the blow or impaction has been delivered to the surface being worked.

It has been stated that the tamp heads of various sizes may be interchangeably used in the apparatus. This interchangeability of tamps is essential because in order to obtain a maximum degree of smoothness in each compacted layer of material and in the finished surface of the completed structure, it is necessary to utilize tamping heads that will not bridge or span uncompacted areas in the roadway or a space that may be left between, say, two pieces of aggregate used in the building of a roadway. For instance, rollers, or horizontal rigid cylinders have been used for compacting roadways or other surfaces, but such an instrument quite often bridges the soft portions of the surface while riding the high areas therein which need less compaction. This failure to uniformly compact all areas of the surface by a compacting instrument having an appreciable impacting face, may be likened to placing an egg on the ground, flanked on either side by a stone thicker than the egg and passing a roller over the stones. In such case, the roller would have no effect on the egg because it bridges the egg and rides on the stones. Rollers, therefore, produce irregular compaction in roadways and like surfaces, and they increase the density where least needed and leave more or less uncompacted the soft bridged areas, whereas by using impacting members having faces of minimum area that will search out all zones of the surface capable of compaction by the expected ultimate superimposed loads, there will be obtained a finished smooth surface that will be retained during the life of the structure. For instance, in connection with roadways there should not be left uncompacted, any area or zone larger than the smallest wheel of traffic that may be imposed upon the roadway when completed. Tires of normal wheels are about three inches in diameter in cross-section, and when carrying about thirty-five pounds of air pressure, such tires have an area in contact with the roadway that is about three inches in diameter. Therefore, to meet conditions such as these, a tamp head three inches in diameter would be approximately of the maximum effective size in carrying out the present method. Also, in macadam roadways, the largest size of stones or aggregate used is about three and one-half inches in diameter, or has a major dimension of, say, three and one-half inches, so that here again a three-inch tamp head should be utilized to prevent bridging of the tamps over uncompacted areas. It will be understood, of course, that smaller sizes of tamps should be used to drive smaller sizes of aggregate into the closest possible contact. It is also preferred that the chassis be of sufficient length to give the smooth surface sought in the present instance. A chassis having a length equal to one and one-half to two times the wheel base of automobiles will eliminate all irregularities that can be felt in the ordinary automobile. In actual practice a chassis of approximately twenty-five feet in length has been found to give the desired results.

Aside from the specific form of apparatus disclosed, the method employed in the present instance consists in first loosely depositing a layer of material on the contemplated roadway or bed thereof, after which the material is leveled by reducing any elevations that may be present therein, and filling any depressions therein, this being accomplished by passing over the material a straight edge that is maintained in a constant or fixed horizontal plane. Over this level layer of material, there is then passed the tamps which, on account of their size, compact or drive the particles into the closest possible contact. Although the material is thus compacted, the size of the impacted faces is such that a smooth surface will be obtained. The next succeeding layer of material which may be of the same material or of a different material, is deposited on a previously compacted layer, and the surface thereof similarly worked. This operation is carried out with all succeeding layers, so that upon completion of the roadway or other structure, the desired density and smoothness of surface will be obtained and, due to the fact that there has not been left any zone or area of greater size than the smallest area that will be affected by an ultimate load, that finished smoothness of the structure will be retained during the life thereof.

It may also be desirable to alter the vertical position of cross members 29 and the tamps 27. For this purpose, said cross members are suspended on rods 46, whose upper ends are provided with worm wheels 47 engaged by worms 48, 48a on shafts 49, 49a respectively, at opposite sides of the chassis and which shafts are adapted to be actuated by the hand wheels 56, 57 on shaft 22. As in the case of the leveling instruments, cross members 29 may have attached thereto links 50 loosely connected to brackets 51 attached to the chassis.

It is preferred that the lutes be capable of being reciprocated transversely of the chassis. This operation of the lutes, and their construction, is shown in detail in Figs. 3 and 6 to 10. For instance each lute 14 proper is secured between two angle members 58 and the latter are secured to two angle members 59 disposed at opposite sides of a vertically extending plate 60 and slidably secured thereto by bolts 61 projecting through said members 59 and slots 62 in said plate. Plate 60 is slidable vertically in ways 63 in bearing blocks 52. The angle members 58, 59, carrying lute 14 are reciprocated by a pitman 64 attached eccentrically to a gear 65 adapted to be driven from shaft 45 by sprocket chains 66, 67 as shown in Fig. 3. The lower edge of plate 60 is bifurcated as at 68, at a plurality of points, to form housings for roller bearings 69 against which angle members 58 bear.

In connection with the hand wheels 54, 55, 56 and 57 for adjusting the lutes and tamps, each of said wheels is formed with a hub 70 on which is mounted a sprocket 71. The several wheels are loose on shaft 22. Sprocket 71 of wheel 54 is connected by chain 72 to a sprocket 73 on a shaft 74 which carries a gear 75 meshing with a gear 76 on shaft 24. The sprocket 71 of wheel 55 is connected by a chain 26 to a sprocket 77 on a shaft 78 carrying a gear 79 which meshes with a gear 80 on shaft 25. Sprocket 71 of wheel 56 is connected by a chain 81 to a sprocket 82 on a shaft 83 which carries a gear 84 meshing with a gear 85 on shaft 49. Sprocket 71 of wheel 57 is connected by a chain 86 to a sprocket 87 on a shaft 88 which carries a gear 89 meshing with a gear 90 on shaft 49a. Through these several connections the lutes and tamps may be adjusted vertically at the will of the operator.

What we claim is:

1. The method of laying roadways and the like which comprises depositing the roadway material in successive layers, leveling out the surface of each layer after its deposit, and effecting dense, traffic-resistant impaction of the roadway material by applying to the surface of each leveled layer a multiplicity of individual, substantially instantaneous blows each of which is restricted to a zone which is of less area than the minimum load-bearing surface of vehicles for which the road is designed, and all of which impacted zones are collectively coextensive with the surface of the layer.

2. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the roadbed, a multiplicity of tamping elements carried by said chassis in layer-overlying relation, each of said tamping elements having a layer-impacting surface of less area than the minimum load-bearing surface of vehicles for which the road is designed, said tamping elements being disposed in closely-adjacent side-by-side relation collectively covering the layer surface overlain, and means for individually actuating said tamping elements to impose substantially instantaneous restricted blows upon the surface of said loosely deposited roadway layer at such frequency with respect to the rate of travel of said chassis as to cover the entire traversed surface of the layer and reduce the road material of the layer to a uniformly dense, traffic-resistant impacted state.

3. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the road-bed, a multiplicity of tamping elements carried by said chassis in layer-overlying relation, each of said tamping elements having a layer-impacting surface of less area than the minimum load-bearing surface of vehicles for which the road is designed, said tamping elements being disposed transversely of said chassis, extending thereacross in a plurality of closely-adjacent rows, the individual tamping elements of each row being spaced from each other and staggered with respect to the tamping elements of the adjacent row and collectively covering the layer surface overlain, and means for individually actuating said tamping elements to impose substantially instantaneous, restricted blows upon the surface of said loosely deposited roadway layer at such frequency with respect to the rate of travel of said chassis as to cover the entire traversed surface of the layer and reduce the road material of the layer to a uniformly dense, traffic-resistant impacted state.

4. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the road-bed, a multiplicity of tamping elements carried by said chassis in layer-overlying relation, each of said tamping elements having a layer-impacting surface of less area than the minimum load-bearing surface of vehicles for which the road is designed, said tamping elements being disposed transversely of said chassis, extending thereacross in a plurality of closely-adjacent rows, the individual tamping elements of each row being spaced from each other and staggered with respect to the tamping elements of the adjacent row and collectively covering the layer surface overlain, and means for actuating said tamping elements in timed, staggered sequence to impose individual, restricted, substantially instantaneous blows upon the surface of said loosely deposited roadway layer at such frequency with respect to the rate of travel of said chassis as to cover the entire traversed surface of the layer and reduce the road material of the layer to a uniformly dense, traffic-resistant impacted state.

5. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the road-bed, a multiplicity of tamping elements carried by said chassis in layer-overlying relation, each of said tamping elements having a layer-impacting surface of less area than the minimum load-bearing surface of vehicles for which the road is designed, said tamping elements being disposed transversely of said chassis, extending thereacross in a plurality of closely-adjacent rows, the individual tamping elements of each row being spaced from each other and staggered with respect to the tamping elements of the adjacent row and collectively covering the layer surface overlain, and means for actuating said tamping elements in timed, staggered sequence to impose individual, restricted, substantially instantaneous blows upon the surface of said loosely deposited roadway layer at such frequency with respect to the rate of travel of said chassis as to cover the entire traversed surface of the layer and reduce the road material of the layer to a uniformly dense, traffic-resistant impacted state.

6. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the road-bed, a multiplicity of tamping elements carried by said chassis in layer-overlying relation, each of said tamping elements having a layer-impacting surface of less area than the minimum load-bearing surface of vehicles for which the road is designed, said tamping elements being disposed in closely-adjacent side-by-side relation collectively covering the layer surface overlain, and means for individually actuating said tamping elements to impose substantially instantaneous restricted blows upon the surface of said loosely deposited roadway layer at such frequency with respect to the rate of travel of said chassis as to cover the entire traversed surface of the layer and reduce the road material of the layer to a uniformly dense, traffic-resistant impacted state, said actuating means comprising a spring for projecting each of said tamping elements downwardly upon the surface of the roadway layer, means for retracting each of said tamping elements against the compression of its respective spring and suddenly releasing said tamping element, and a spring for effecting substantially instantaneous retraction of each tamping element, after the delivery of its blow, to a position above and out of contact with the surface of the roadway layer.

7. In an apparatus for laying roadways and the like, a chassis having a running gear of such character as to maintain said chassis in a plane parallel to the road-bed and at a predetermined level with respect thereto, means for propelling said chassis, means carried by said chassis for distributing, in a flat-surfaced layer, road material loosely deposited upon the road-bed, a multiplicity of tamping elements carried by said chassis in layer-overlying relation, each of said tamping elements having a layer-impacting surface of less area than the minimum load-bearing surface of vehicles for which the road is designed, said tamping elements being disposed in closely-adjacent side-by-side relation collectively covering the layer surface overlain, and means for individually actuating said tamping elements to impose substantially instantaneous restricted blows upon the surface of said loosely deposited roadway layer at such frequency with respect to the rate of travel of said chassis as to cover the entire traversed surface of the layer and reduce the road material of the layer to a uniformly dense, traffic-resistant impacted state, said actuating means comprising springs for projecting each of said tamping elements downwardly upon the surface of the roadway layer, means for individually retracting each of said tamping elements against the compression of its respective spring and suddenly releasing said tamping element in timed, staggered sequence with respect to the release of other tamping elements, said means comprising a cam shaft having a multiplicity of cams, one associated with each of said tamping elements, and a second spring associated with each of said tamping elements operative to effect substantially instantaneous retraction of its respective tamping element, after the delivery of its blow, to a position above and out of contact with the surface of the roadway layer.

8. In an apparatus for laying roadways and the like, a chassis having a running gear of such character as to maintain said chassis in a plane parallel to the road-bed and at a predetermined level with respect thereto, said chassis comprising a long frame, a plurality of axles extending transversely of said frame in spaced relation therealong, a multiplicity of road wheels rotatively journaled upon said axles and affording road-bed support for said chassis over a zone substantially co-extensive with the extent of said frame, a plurality of springs yieldingly supporting said frame upon said axles and permitting upward displacement of an axle without material upward displacement of said frame, and means for limiting material downward displacement of any one axle with respect to the other axles, means for propelling said chassis, means carried by said frame for distributing, in a flat-surfaced layer, road material loosely deposited upon the road-bed, a multiplicity of tamping elements carried by said frame in layer-overlying relation, each of said tamping elements having a layer-impacting surface of less area than the minimum load-bearing surface of vehicles for which the road is designed, said tamping elements being disposed in closely-adjacent side-by-side relation collectively covering the layer surface overlain, and means for individually actuating said tamping elements to impose substantially instantaneous, restricted blows upon the surface of said loosely deposited roadway layer at such frequency with respect to the rate of travel of said chassis as to cover the entire traversed surface of the layer and reduce the road material of the layer to a uniformly dense, traffic-resistant impacted state.

9. In an apparatus for laying crushed-stone roadways and the like, a frame, a multiplicity of tamping elements carried by said frame in road-overlying relation, each of said tamping elements having a road-impacting surface of less area than the minimum load-bearing surface of vehicles for which the road is designed, said tamping elements being disposed in closely-adjacent side-by-side relation collectively covering the road surface overlain, and means for actuating said tamping elements to impose individual, substantially instantaneous rebounding blows upon the loose uncondensed material of the roadway under construction and reduce the road material to a uniformly dense, traffic-resistant, impacted state substantially free from voids.

10. In an apparatus for laying roadways and the like, a frame, a multiplicity of tamping elements carried by said frame in road-overlying relation, each of said tamping elements having a road-impacting surface of less area than the minimum load-bearing surface of vehicles for which the road is designed, said tamping elements being disposed in closely-adjacent, side-by-side relation collectively covering the road surface overlain, and means for actuating said tamping elements to impose individual, substantially instantaneous rebounding blows upon the loose, uncondensed material of the roadway under construction and reduce the road material to a uniformly dense, traffic-resistant, impacted state substantially free from voids, said tamp-actuating means comprising a spring for projecting each of said tamping elements downwardly upon the surface of the roadway under construction, means for retracting each of said tamping elements against the compression of its respective spring and suddenly releasing said tamping element, and a spring for effecting substantially instantaneous retraction of each tamping element, after the delivery of its blow, to a position above and out of contact with the surface of the roadway.

SAM E. FINLEY.
ROBERT D. KNEALE.